United States Patent
Tagawa et al.

(10) Patent No.: US 11,462,933 B2
(45) Date of Patent: Oct. 4, 2022

(54) POWER STORAGE MODULE AND POWER SUPPLY SYSTEM

(71) Applicant: Murata Manufacturing Co., Ltd., Nagaokakyo (JP)

(72) Inventors: Shuichi Tagawa, Nagaokakyo (JP); Yousuke Takei, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 226 days.

(21) Appl. No.: 16/863,350

(22) Filed: Apr. 30, 2020

(65) Prior Publication Data
US 2020/0259360 A1    Aug. 13, 2020

Related U.S. Application Data

(63) Continuation of application No. PCT/JP2018/038364, filed on Oct. 15, 2018.

(30) Foreign Application Priority Data

Nov. 16, 2017 (JP) .............................. JP2017-220643

(51) Int. Cl.
*H02J 7/06* (2006.01)
*H02M 3/158* (2006.01)
(Continued)

(52) U.S. Cl.
CPC .............. *H02J 7/06* (2013.01); *H01M 10/44* (2013.01); *H01M 10/486* (2013.01);
(Continued)

(58) Field of Classification Search
CPC ........ H02J 7/06; H02J 7/00; H02J 7/35; H02J 7/0047; H02M 3/158; H01M 10/44; H01M 10/615; H01M 10/627; H01M 10/633; H01M 10/486

USPC ......................................................... 320/134
See application file for complete search history.

(56) References Cited

U.S. PATENT DOCUMENTS

2009/0167234 A1* 7/2009 Uechi ................. B60W 30/192
                                                         318/800
2010/0289452 A1* 11/2010 Wagatsuma .......... H02M 3/156
                                                         320/109
(Continued)

FOREIGN PATENT DOCUMENTS

CN    103532379 A  *  1/2014
JP    2010182511 A     8/2010
(Continued)

OTHER PUBLICATIONS

Japanese Office Action issued for JP Application No. 2019-553754, dated Jun. 22, 2021.
(Continued)

*Primary Examiner* — Richard Isla
*Assistant Examiner* — Dung V Bui
(74) *Attorney, Agent, or Firm* — ArentFox Schiff LLP

(57) ABSTRACT

A battery module that includes a battery and a bidirectional DC-DC converter including a switching element that is arranged at a position where heat generated by the switching element is transmitted to the battery. The bidirectional DC-DC converter operates in a discharge mode in which DC power supplied from the battery is converted and supplied to an input/output unit, and in a charge mode in which DC power supplied from the input/output unit is converted and supplied to the battery. Moreover, a control unit forces the bidirectional DC-DC converter to operate in the discharge mode and to increase a switching frequency of the switching element in comparison with a switching frequency in normal driving, when a temperature in a periphery of the battery needs to be increased.

20 Claims, 9 Drawing Sheets

(51) Int. Cl.
H02J 7/00 (2006.01)
H02J 7/35 (2006.01)
H01M 10/44 (2006.01)
H01M 10/615 (2014.01)
H01M 10/627 (2014.01)
H01M 10/633 (2014.01)
H01M 10/667 (2014.01)
H01M 10/48 (2006.01)

(52) U.S. Cl.
CPC ....... H01M 10/615 (2015.04); H01M 10/627 (2015.04); H01M 10/633 (2015.04); H01M 10/667 (2015.04); H02J 7/0047 (2013.01); H02J 7/35 (2013.01); H02M 3/158 (2013.01); H01M 2220/10 (2013.01); H02J 2207/20 (2020.01)

(56) References Cited

U.S. PATENT DOCUMENTS

| | | | | |
|---|---|---|---|---|
| 2011/0291606 | A1* | 12/2011 | Lee | ............... H02J 3/32 320/101 |
| 2014/0197778 | A1* | 7/2014 | Kim | ............... H02J 7/007194 320/107 |
| 2014/0285155 | A1* | 9/2014 | Choi | ............... H02J 7/02 320/130 |

FOREIGN PATENT DOCUMENTS

| | | | | |
|---|---|---|---|---|
| JP | 2012161189 | A | | 8/2012 |
| JP | 2012212628 | A | | 11/2012 |
| JP | 2012218535 | A | | 11/2012 |
| JP | 2013055019 | A | | 3/2013 |
| JP | 2014026814 | A | | 2/2014 |
| JP | 2015037013 | A | | 2/2015 |
| JP | 2016146252 | A | * | 8/2016 |
| JP | 2016146252 | A | | 8/2016 |
| JP | 2016184476 | A | | 10/2016 |
| JP | 2017175888 | A | | 9/2017 |

OTHER PUBLICATIONS

International Search Report Issued for PCT/JP2018/038364, dated Nov. 27, 2018.
Written Opinion of the International Searching Authority issued for PCT/JP2018/038364, dated Nov. 27, 2018.

* cited by examiner

POWER STORAGE MODULE AND POWER SUPPLY SYSTEM

CROSS REFERENCE TO RELATED APPLICATIONS

The present application is a continuation of PCT/JP2018/038364 filed Oct. 15, 2018, which claims priority to Japanese Patent Application No. 2017-220643, filed Nov. 16, 2017, the entire contents of each of which are incorporated herein by reference.

TECHNICAL FIELD

The present invention relates to a power storage module and a power supply system.

BACKGROUND

Currently there are proposed temperature regulation devices that are for a battery pack and that include a fan for guiding air into a container housing a plurality of batteries and a heater for heating the air (see, for example, Patent Document 1, identified below). In an example configuration, the temperature regulation device for the battery pack includes a temperature sensor for detecting a temperature of each of a plurality of batteries, and a temperature control means for adjusting a temperature of the battery pack based on the temperature detected by the temperature sensor. Additionally, according to the temperature of the battery pack, the temperature control means operates the heater to keep a temperature in the container housing the battery pack constant.

Patent Document 1: Japanese Unexamined Patent Application Publication No. 2013-55019.

However, with the configuration described in Patent Document 1, since it is necessary to arrange the heater in the container, the entire module including the battery pack and the heater is large.

SUMMARY OF THE INVENTION

Accordingly, the exemplary embodiments of the present invention have been made in view of the above reason. Thus, it is an object of the present invention is to provide a power storage module and a power supply system that are miniaturized while preventing an excessive temperature drop in a secondary battery.

Thus, according to an exemplary embodiment, a power storage module is provided that includes a secondary battery, a bidirectional DC-DC converter including a switching element, which is arranged at a position where heat generated by the switching element is transmitted to the secondary battery, and configured to operate in a discharge mode in which DC power supplied from the secondary battery is converted and supplied to an input/output unit, and in a charge mode in which DC power supplied from the input/output unit is converted and supplied to the secondary battery. Moreover, a control unit is provided and configured to force the bidirectional DC-DC converter to operate in the discharge mode and configured to increase a switching frequency of the switching element in comparison with a switching frequency in normal driving, when a temperature of the secondary battery needs to be increased.

Further, the power storage module can be provided in which the control unit sets the switching frequency of the switching element to a maximum frequency within an operational range to maximize DC power to be supplied from the bidirectional DC-DC converter to the input/output unit, when a temperature of the secondary battery needs to be increased.

Further, the power storage module can also be provided in which the bidirectional DC-DC converter includes an inductor connected at one end to an output terminal on a high potential side of the secondary battery, a first switching element connected between the other end of the inductor and the input/output unit, and a second switching element connected between the other end of the inductor and an output end on a low potential side of the secondary battery. In this aspect, the control unit maintains the first switching element in an off state, when a temperature of the secondary battery needs to be increased.

Further, the power storage module can be provided in which the secondary battery includes a lithium ion battery.

Moreover, in another aspect, a power supply system is provided that includes a power conditioner including a DC bus line, a DC-DC converter configured to convert DC power supplied from a power generator to DC power having a different voltage value to supply the converted DC power to the DC bus line, and a bidirectional DC-AC inverter configured to convert AC power supplied from a power system into DC power to supply the converted DC power to the DC bus line, and configured to convert DC power supplied from the DC bus line into AC power to supply the converted AC power to an AC load connected to the power system. In this aspect, a power storage module is provided that includes a secondary battery, a bidirectional DC-DC converter that includes a switching element, that is arranged at a position where heat generated by the switching element is transmitted to the secondary battery, and that is configured to operate in a discharge mode in which DC power supplied from the secondary battery is converted and supplied to the DC bus line through an input/output unit, and in a charge mode in which DC power supplied from the DC bus line through the input/output unit is converted and supplied to the secondary battery and a control unit configured to force the bidirectional DC-DC converter to operate in the discharge mode and configured to increase a switching frequency of the switching element, when a temperature of the secondary battery needs to be increased.

Further, the power supply system can be provided in which the power conditioner includes a power measuring unit configured to measure power consumption in the AC load, a command unit configured to output command information commanding that an output from the bidirectional DC-DC converter is allowed to become a maximum output within an output range in which reverse power flow from the DC bus line to the power system does not occur, to the control unit, according to power consumption in the AC load measured by the power measuring unit, when a temperature of the secondary battery needs to be increased.

Further, the power supply system can be provided in which the power conditioner includes a command unit configured to output command information commanding that an output of the bidirectional DC-DC converter is allowed to become a predetermined output which is equal to or lower than a maximum output of the bidirectional DC-DC converter, to the control unit, when a temperature of the secondary battery needs to be increased.

According to exemplary embodiments of the present invention, when a temperature of the secondary battery needs to be increased, the control unit forces the bidirectional DC-DC converter to operate in the discharge mode and increases the switching frequency of the switching element. Thereby, an amount of heat generated by the switching element is increased, and an amount of heat transmitted from the switching element to a periphery of the secondary battery is increased, so that the temperature of the secondary battery can be increased quickly. Therefore, since there is no need to arrange a heater in the periphery of the secondary battery in order to quickly increase the temperature in the periphery of the secondary battery, it is possible to reduce an entire size of the power storage module.

BRIEF DESCRIPTION OF DRAWINGS

FIG. 5A is a diagram showing a current waveform and a voltage waveform when a switching element is turned on.

DETAILED DESCRIPTION OF EMBODIMENTS

Hereinafter, an exemplary embodiment of the present invention will be described in detail with reference to the accompanying drawings. As described herein, a power supply system is provided that is a distributed power supply system, and supplies power to an AC load from a solar battery or a secondary battery in interconnection with a power system. The exemplary power supply system includes a power conditioner and a power storage module connected to the power conditioner. The power conditioner includes a bidirectional DC-AC inverter configured to convert AC power supplied from the power system into DC power to supply the DC power to a DC bus line, and to convert DC power supplied from the DC bus line into AC power to supply the AC power to the AC load connected to the power system. The power storage module includes a secondary battery, a bidirectional DC-DC converter interposed between the secondary battery and an input/output unit connected to the DC bus line, and a control unit for controlling the bidirectional DC-DC converter. The bidirectional DC-DC converter operates in a discharge mode in which DC power supplied from the secondary battery is converted and supplied to the input/output unit, and in a charge mode in which DC power supplied from the DC bus line through the input/output unit is converted and supplied to the secondary battery. Moreover, when a temperature of the secondary battery needs to be increased, the control unit forces the bidirectional DC-DC converter to operate in the discharge mode and increases a switching frequency of a switching element to heat the secondary battery.

Figure 1:
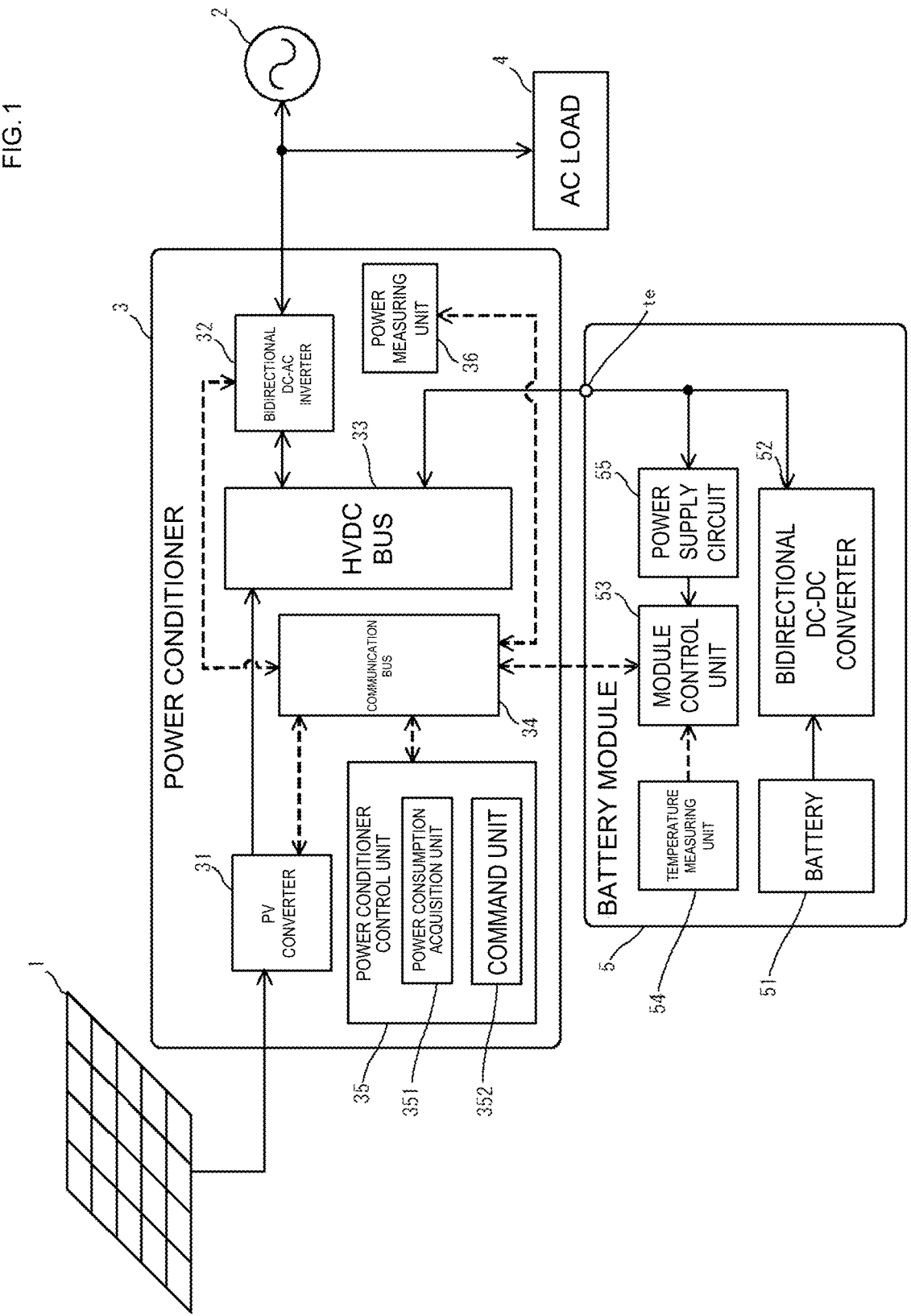
FIG. 1 is a schematic configuration diagram of a power supply system according to an exemplary embodiment.

As shown in FIG. 1, the power supply system according to the present embodiment includes a solar battery 1 as a power generator, a power conditioner 3 connected to the solar battery 1 and a power system 2, and a battery module 5. Additionally, the power system 2 is connected with an AC load 4, such as a household electric appliance that operates when AC power is supplied.

According to the exemplary embodiment, the power conditioner 3 includes a HVDC bus (high voltage DC bus line) 33 and a PV converter (DC-DC converter) 31 that supplies DC power to the HVDC bus 33. In addition, the power conditioner 3 also includes a bidirectional DC-AC inverter 32 that is configured to convert AC power supplied from the power system 2 into DC power to supply the DC power to the HVDC bus 33, and also to convert DC power supplied from the HVDC bus 33 into AC power to supply the AC power to the AC load 4 connected to the power system 2. Furthermore, the power conditioner 3 includes a communication bus 34 and a power conditioner control unit 35 that is configured to control an operation of the entire power conditioner 3. Moreover, the power conditioner control unit 35 controls the PV converter 31 and the bidirectional DC-AC inverter 32 by transmitting and receiving control information between the PV converter 31 and the bidirectional DC-AC inverter 32 via the communication bus 34. In an exemplary aspect, the voltage on the HVDC bus 33 is maintained, for example, at 360 V.

In operation, the PV converter 31 is configured to convert DC power received from the solar battery 1 into DC power having a different voltage value, and output the converted DC power to the HVDC bus 33. The PV converter 31 has a function of maximizing an output power of the solar battery 1 by performing maximum power point tracking (MPPT) control in an exemplary aspect.

Moreover, the bidirectional DC-AC inverter 32 is configured to convert AC power supplied from the power system 2 into DC power to supply the DC power to the HVDC bus 33, and to convert DC power supplied from the HVDC bus 33 into AC power to supply the AC power to the AC load 4. In an exemplary aspect, the bidirectional DC-AC inverter 32 can perform constant current control for controlling a current to be supplied to the HVDC bus 33 to be a constant value, for example.

A power measuring unit 36 is further configured to measure power consumption in the AC load 4, and output power consumption measurement value information indicating a power consumption measurement value obtained by the measurement to the communication bus 34.

As further shown, the power conditioner control unit 35 includes a Micro Processing Unit (MPU) and a storage unit. In addition, the MPU is configured to function as a power consumption acquisition unit 351 and a command unit 352 by reading and executing a software program stored in the storage unit. The power consumption acquisition unit 351 acquires the power consumption measurement value information from the power measuring unit 36 for measuring power consumption in the AC load 4 via the communication bus 34.

The command unit 352 is configured to generate operation command information for commanding an operation mode of a bidirectional DC-DC converter 52 according to DC power supplied from the solar battery 1 to the HVDC bus 33 via the PV converter 31 and power consumption in the AC load 4. Then, the command unit 352 transmits the generated operation command information to a module control unit 53 in the battery module 5 via the communication bus 34. For example, when an amount of power generated in the solar battery 1 is large, the command unit 352 transmits operation command information commanding that the bidirectional DC-DC converter 52 is allowed to operate in a charge mode, to the module control unit 53. On the other hand, when the amount of power generated in the solar battery 1 is small, for example, the command unit 352 transmits operation command information commanding that the bidirectional DC-DC converter 52 is allowed to operate in a discharge mode, to the module control unit 53.

Further, in an exemplary aspect, the command unit 352 receives forced discharge notification information notifying that the bidirectional DC-DC converter 52 (to be described later) is forced to operate in the discharge mode, from the module control unit 53. In this case, the command unit 352 generates command information indicating an output command value set for the bidirectional DC-DC converter 52 according to power consumption in the AC load 4 indicated by the power consumption measurement value information acquired by the power consumption acquisition unit 351, and transmits the command information to the module control unit 53. The output command value is a value corresponding to a maximum output within an output range in which reverse power flow does not occur from the HVDC bus 33 to the power system 2.

The battery module 5 includes a battery (e.g., a secondary battery) 51, the bidirectional DC-DC converter 52, the module control unit 53, a temperature measuring unit 54, a power supply circuit 55, and a housing (not shown) for housing these components. Additionally, the battery module 5 has an input/output unit to for inputting and outputting DC power to and from the HVDC bus 33 of the power conditioner 3. The bidirectional DC-DC converter 52 is interposed between the battery 51 and the input/output unit te. In this aspect, the battery module 5 is electrically connected to the HVDC bus 33 of the power conditioner 3 via an input/output unit te.

Figure 2:
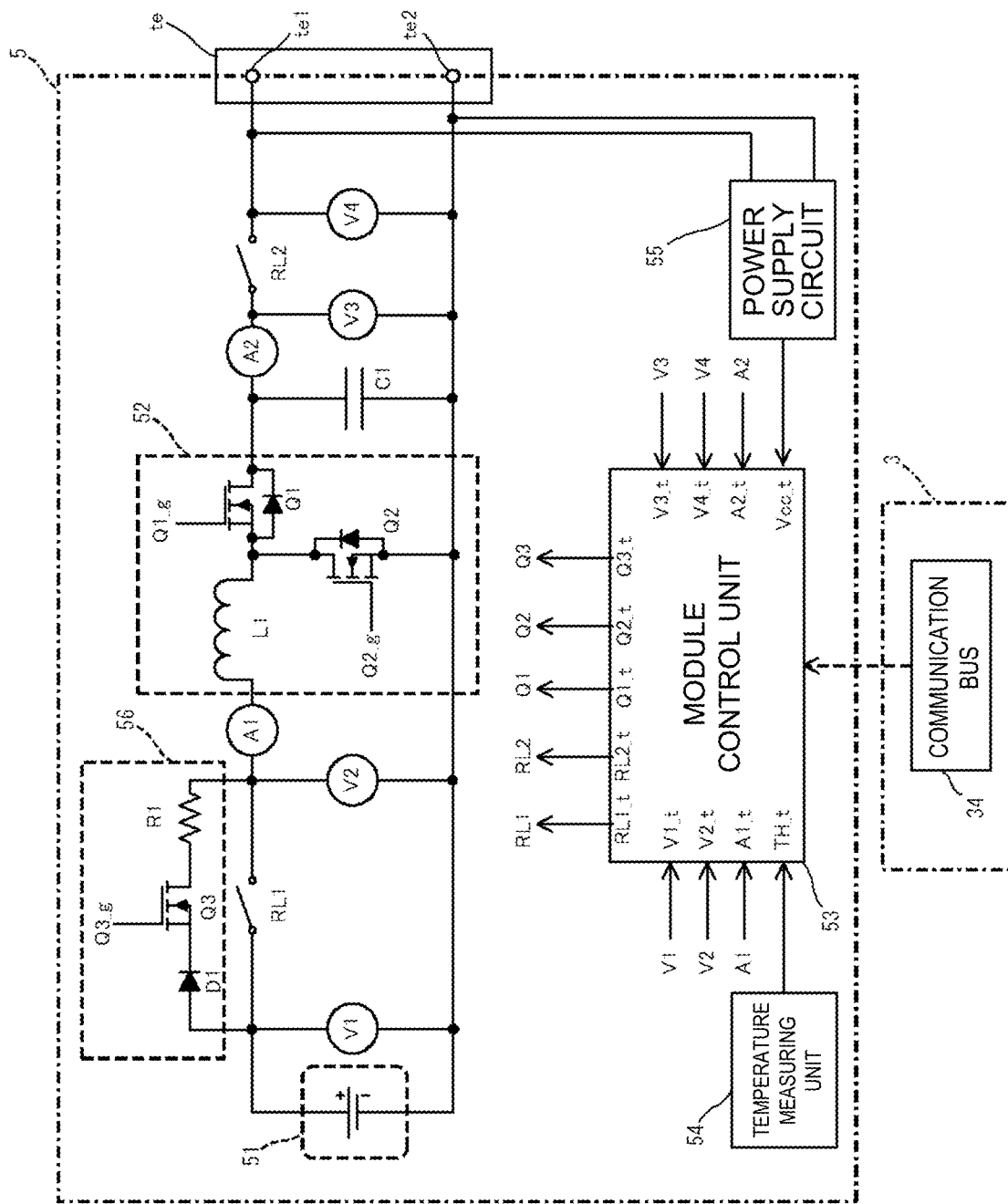
FIG. 2 is a circuit diagram of a battery module according to the exemplary embodiment.

As shown in FIG. 2, the input/output unit te includes an input/output terminal te1 on a high potential side and an input/output terminal te2 on a low potential side (e.g., a ground potential side). A capacitor C1 is connected between input/output ends of the bidirectional DC-DC converter 52 on an input/output unit te side.

Additionally, the battery module 5 includes a relay RL1 connected between an input/output end on the high potential side of the battery 51 and an input/output end on the high potential side and on a battery 51 side of the bidirectional DC-DC converter 52, and an inrush current prevention circuit 56 connected in parallel with the relay RL1. The relay RL1 is, for example, a single-pole single-throw type electromagnetic relay or a semiconductor relay. The inrush current prevention circuit 56 is a circuit for preventing an excessive current from flowing in a switching element Q1 (which will be described later) when the relay RL1 is closed in a state in which the capacitor C1 is not charged. As shown, the inrush current prevention circuit 56 includes a diode D1, a switching element Q3, and a resistor R1. An anode of the diode D1 is connected to the input/output end on the high potential side of the battery 51. The switching element Q3 is an N-channel type FET, for example, and is connected to a cathode of the diode D1. The resistor R1 is connected between the switching element Q3 and an input/output end on the high potential side and on the battery 51 side of the bidirectional DC-DC converter 52. Furthermore, the battery module 5 includes a relay RL2 interposed in series between the input/output terminal te1 and an input/output end on the high potential side and on the input/output unit to side of the bidirectional DC-DC converter 52. The relay RL2 is, for example, a single-pole single-throw type electromagnetic relay or a semiconductor relay.

The battery module 5 further includes a voltmeter V1 for measuring a voltage between both ends of the battery 51, a voltmeter V2 for measuring a voltage between the input/output ends on the battery 51 side of the bidirectional DC-DC converter 52, and a voltmeter V3 for measuring a voltage between both ends of the capacitor C1. The battery module 5 further includes a voltmeter V4 for measuring a voltage between a connection point between the relay RL2 and the input/output terminal te1 and the input/output end on the low potential side and on the input/output unit to side of the bidirectional DC-DC converter 52. Each of the voltmeters V1, V2, V3, and V4 outputs a voltage signal having a magnitude proportional to a magnitude of a respective measured voltage value to the module control unit 53.

Also, the battery module 5 includes an ammeter A1 interposed between the relay RL1 and the input/output end on the high potential side and on the battery 51 side of the bidirectional DC-DC converter 52. Further, the battery module 5 includes an ammeter A2 interposed between an output end on the high potential side of the capacitor C1 and the relay RL2. Each of the ammeters A1 and A2 outputs a voltage signal having a magnitude proportional to a magnitude of a measured current value to the module control unit 53.

In one exemplary aspect, the battery 51 is, for example, a battery pack configured with a plurality of battery cells connected in series to each other. The battery cell of the battery 51 is, for example, a lithium ion battery. An output voltage of the battery 51 is set to, for example, 300 V.

Figure 3:
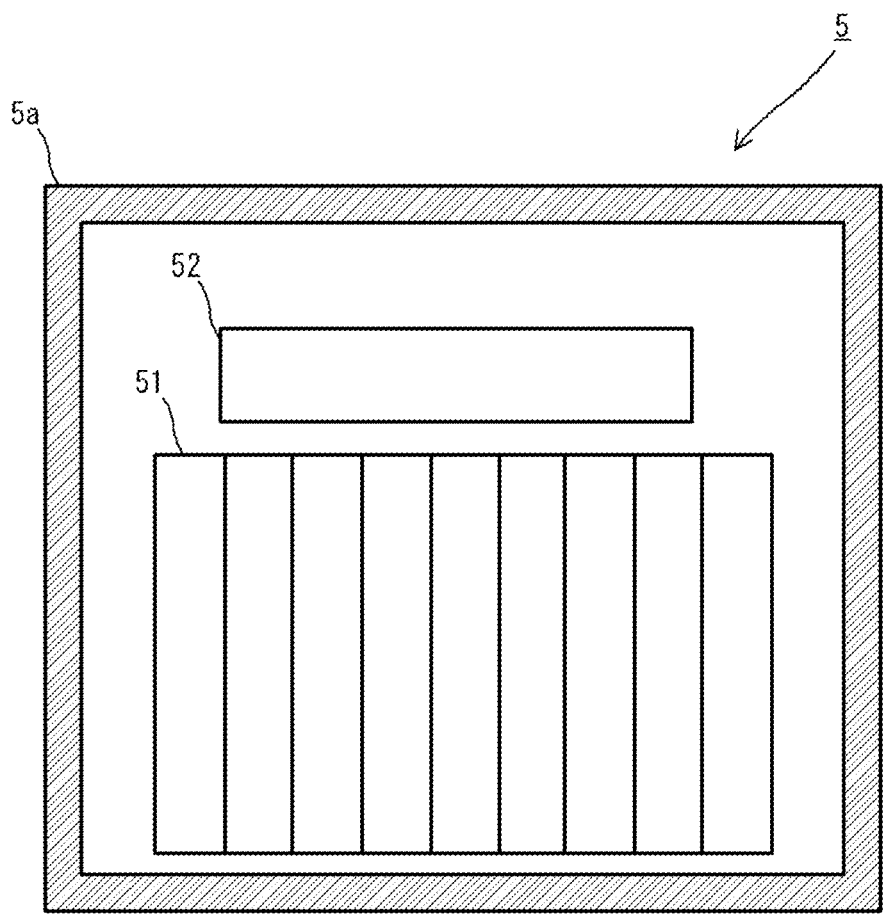
FIG. 3 is a schematic cross-sectional view of the battery module according to the exemplary embodiment.

The bidirectional DC-DC converter 52 of the battery module 5 operates in the discharge mode in which DC power supplied from the battery 51 is converted and supplied to the input/output unit te, and in a charge mode in which DC power supplied from the HVDC bus 33 of the power conditioner 3 via the input/output unit te is converted and supplied to the battery 51. The bidirectional DC-DC converter 52 includes an inductor L1 and the switching elements Q1 and Q2. The bidirectional DC-DC converter 52 is arranged at a position where heat generated by the switching elements Q1 and Q2 is transmitted to the battery 51. For example, as shown in FIG. 3, the bidirectional DC-DC converter 52 is housed along with the battery 51 in one substantially sealed housing 5a so as to be arranged close to and upward of the battery 51. Thus, the heat generated by the switching elements Q1 and Q2 in the bidirectional DC-DC converter 52 is transmitted to the battery 51 through convection of air existing in the housing 5a. It is noted that the bidirectional DC-DC converter 52 may be arranged, for example, close to the battery 51 and below the battery 51.

Referring back to FIG. 2, the inductor L1 is connected to the input/output end on the high potential side of the battery

51 at one end via the relay RL1. The switching element (e.g., a first switching element) Q1 is, for example, an N-channel type FET, and is connected between the other end of the inductor L1 and the input/output end on the high potential side of the capacitor C1. The switching element (e.g., a second switching element) Q2 is, for example, an N-channel type FET, and is connected between the other end of the inductor L1 and the input/output end on the low potential side of the battery 51. In the discharge mode, the bidirectional DC-DC converter 52 boosts DC power supplied from the battery 51 by turning on/off the switching element Q2, and supplies the boosted DC power to the input/output unit te. Also, in the charge mode, the bidirectional DC-DC converter 52 steps down DC power supplied from the HVDC bus 33 via the input/output unit te by turning on/off the switching element Q1, and supplies the DC power stepped down, to the battery 51.

The temperature measuring unit 54 (e.g., a temperature sensor) is configured to measure a temperature in a periphery of the battery 51, and output temperature information indicating the temperature measurement value to the module control unit 53. The power supply circuit 55 is electrically connected to the input/output unit te, and steps down DC power supplied from the input/output unit te to supply the DC power stepped down, to the module control unit 53. The power supply circuit 55 steps down a DC power at 360 V supplied from the input/output unit te, to 5 V, for example, to supply the DC power stepped down, to the module control unit 53.

When a temperature of the battery 51 needs to be increased, the module control unit 53 forces the bidirectional DC-DC converter 52 to operate in the discharge mode and increases a switching frequency of the switching element Q2 relative to the switching frequency in normal driving. Here, when a temperature measurement value indicated by temperature information input from the temperature measuring unit 54 is equal to or lower than a predetermined reference temperature, the module control unit 53 determines that the temperature of the battery 51 needs to be increased. For example, when the battery cell of the battery 51 is a lithium ion battery, when the temperature in the periphery thereof becomes lower than 0° C., for example, an explosion may possibly occur because of breakage of a separator due to deposition of metal lithium when the battery 51 is charged is increased. Therefore, when the battery cell of the battery 51 is a lithium ion battery, the reference temperature is set to 0° C., for example. Moreover, when it is determined that the temperature of the battery 51 needs to be increased (e.g., if it drops below the reference temperature), the module control unit 53 transmits forced discharge notification information for notifying that the bidirectional DC-DC converter 52 is forced to operate in the discharge mode, to the power conditioner control unit 35 via the communication bus 34. Then, the module control unit 53 increases the switching frequency of the switching element Q2 based on command information received from the power conditioner control unit 35 after the module control unit 53 transmits the forced discharge notification information.

The module control unit 53 includes the MPU, the storage unit, a switching element driving circuit for driving the switching elements Q1, Q2, and Q3, and a relay driving circuit for driving the relays RL1 and RL2. The module control unit 53 also has output terminals Q1_t, Q2_t, and Q3_t connected to gates Q1_g, Q2_g, and Q3_g of the switching elements Q1, Q2, and Q3, respectively. The module control unit 53 also has output terminals RL1_t and RL2_t connected to control signal terminals (not shown) of the relays RL1 and RL2, respectively.

The switching element driving circuit is configured to output a control signal to the respective gates Q1_g, Q2_g, and Q3_g of the switching elements Q1, Q2 and Q3 through the output terminals Q1_t, Q2_t, and Q3_t, respectively, based on the control signal input from the MPU. The switching element driving circuit may output a Pulse Width Modulation (PWM) signal as the control signal to the respective gates Q1_g and Q2_g of the switching elements Q1 and Q2. The relay driving circuit outputs a control signal to control signal terminals of the relays RL1 and RL2 through the output terminals RL1_t and RL2_t, respectively, based on the control signal input from the MPU.

Further, the module control unit 53 has input terminals V1_t, V2_t, V3_t, and V4_t, and A1_t, and A2_t connected to the voltmeters V1, V2, V3, and V4, and the ammeters A1, and A2, respectively. Further, the module control unit 53 receives voltage signals from the voltmeters V1, V2, V3, and V4 and the ammeters A1, and A2 via the input terminals V1_t, V2_t, V3_t, and V4_t, and A1_t and A2_t, respectively. Also, the module control unit 53 is connected to the temperature measuring unit 54, and has a terminal TH t to which temperature information is input from the temperature measuring unit 54. Further, the module control unit 53 is configured to communicate with the power conditioner control unit 35 via the communication bus 34 in the power conditioner 3. In addition, the module control unit 53 controls the bidirectional DC-DC converter 52 based on operation command information input from the power conditioner control unit 35 via the communication bus 34.

Further, the module control unit 53 has a power supply terminal Vcc_t connected to the input/output unit te. Additionally, while the bidirectional DC-DC converter 52 is operating in the charge mode, the module control unit 53 receives driving power from the HVDC bus 33 in the power conditioner 3 via the power supply terminal Vcc_t. On the other hand, while the bidirectional DC-DC converter 52 is operating in the discharge mode, the module control unit 53 receives driving power from the battery 51 via the power supply terminal Vcc_t.

Figure 4:
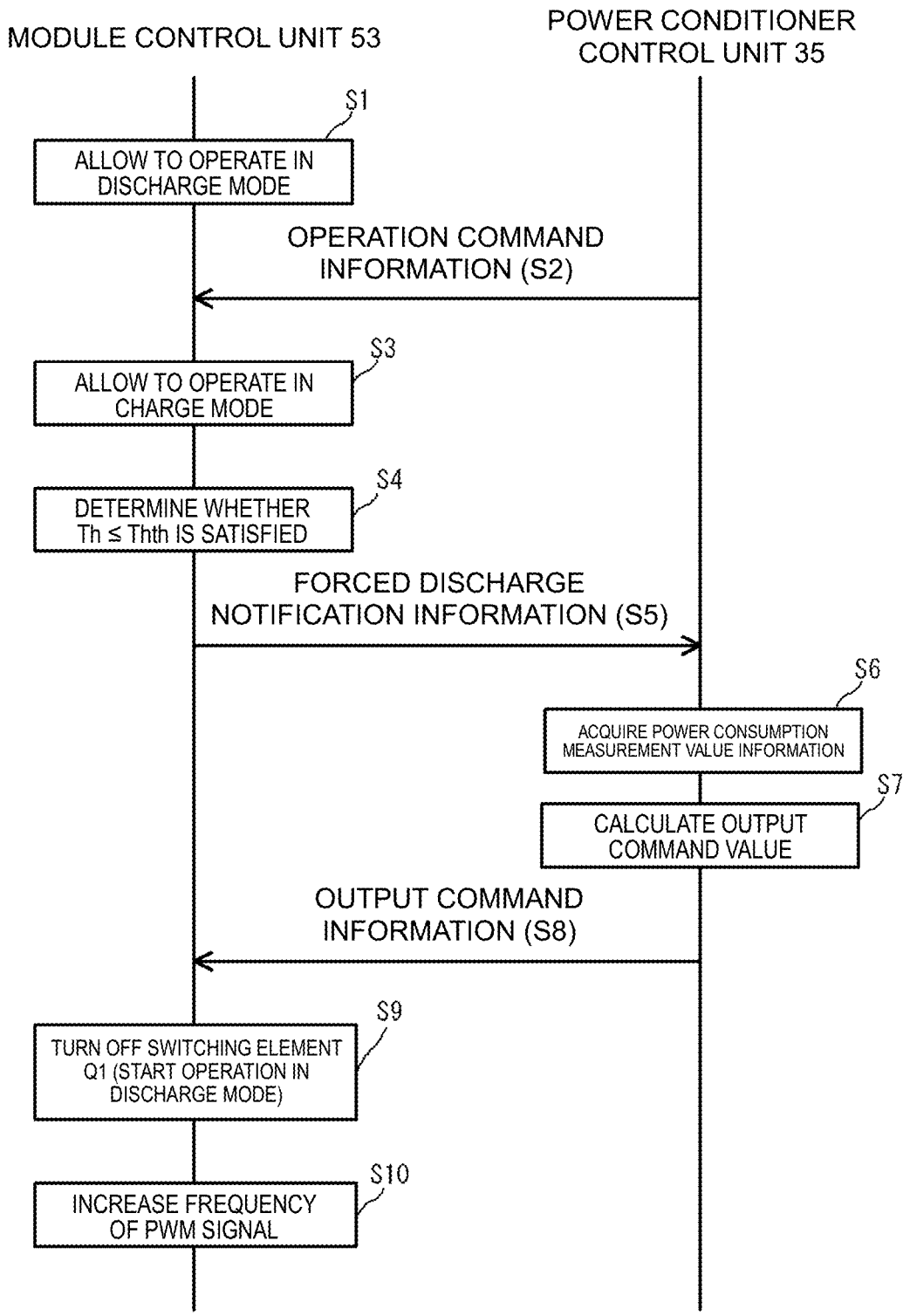
FIG. 4 is a sequence diagram showing operations of a module control unit and a power conditioner control unit.

Next, operations of the module control unit 53 and the power conditioner control unit 35 according to the present embodiment will be described with reference to FIG. 4. Specifically, FIG. 4 shows a state in which the power conditioner 3 and the battery module 5 are operating after startup. First, the module control unit 53 allows the bidirectional DC-DC converter 52 to operate in the discharge mode (step S1). At this time, it is assumed that operation command information commanding that the bidirectional DC-DC converter 52 operates in the discharge mode is transmitted from the power conditioner control unit 35 to the module control unit 53 via the communication bus 34 (step S2). In this case, the module control unit 53 allows the bidirectional DC-DC converter 52 to operate in the charge mode based on the received operation command information (step S3).

Next, it is assumed that the module control unit 53 determines that a temperature Th indicated by temperature information input from the temperature measuring unit 54 is equal to or lower than a predetermined temperature Thth (step S4). In this case, forced discharge notification information for notifying that the bidirectional DC-DC converter 52 is forced to operate in the discharge mode is transmitted from the module control unit 53 to the power conditioner control unit 35 via the communication bus 34 (step S5).

On the other hand, when the power conditioner control unit 35 receives the forced discharge notification information, the power consumption acquisition unit 351 acquires power consumption measurement value information indicating power consumption in the AC load 4 from the power measuring unit 36 (step S6). Subsequently, the command unit 352 calculates an output command value to the bidirectional DC-DC converter 52 based on the power consumption indicated by the power consumption measurement value information (step S7). Thereafter, output command information including the output command value is transmitted from the power conditioner control unit 35 to the module control unit 53 via the communication bus 34 (step S8).

On the other hand, when the module control unit 53 receives the output command information, the module control unit 53 turns off the switching element Q1 of the bidirectional DC-DC converter 52 (step S9). In this manner, the module control unit 53 forcibly starts the operation of the bidirectional DC-DC converter 52 in the discharge mode.

Next, the module control unit 53 increases a frequency of a PWM signal to be supplied to the switching element Q2 of the bidirectional DC-DC converter 52 (step S10). Thereby, a rate of a duration in which a switching loss occurs in the switching element Q2 is increased, and an amount of heat generated by the switching element Q2 is increased accordingly. The heat generated by the switching element Q2 is transmitted to the periphery of the battery 51, so that a temperature in the periphery of the battery 51 is increased, and the battery 51 is heated.

Figure 5A:
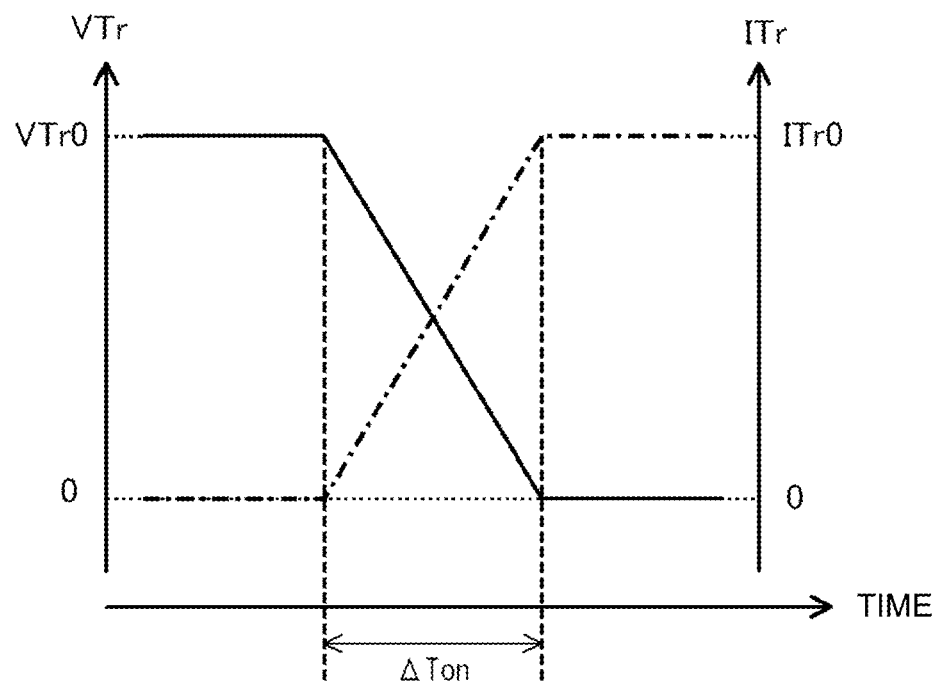
Figure 5B:
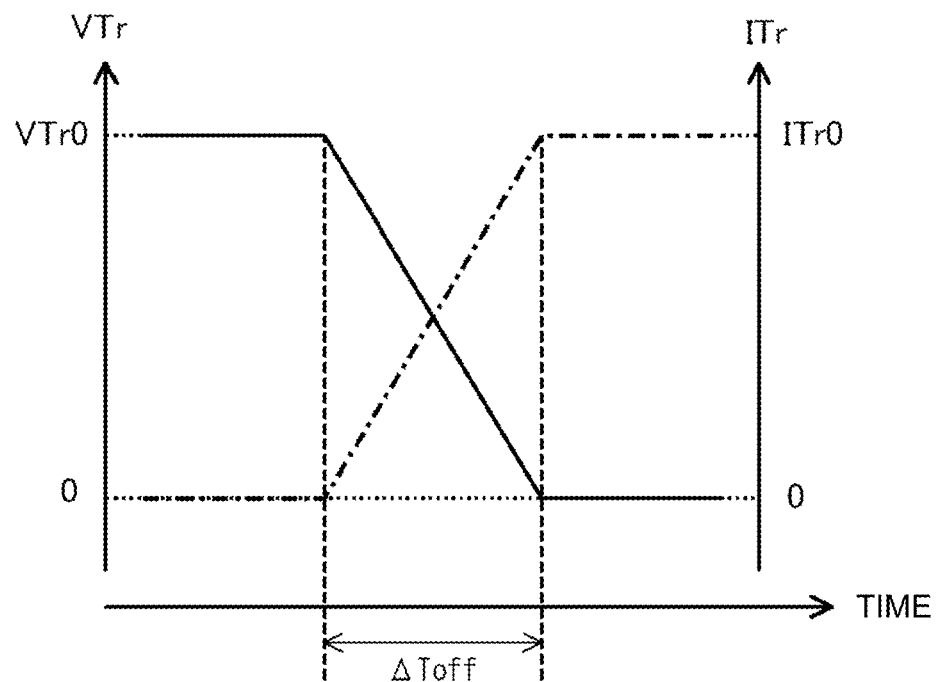
FIG. 5B is a diagram showing a current waveform and a voltage waveform when the switching element is turned off.

Here, a relationship between the duration in which the switching loss occurs in the switching element Q2 and a frequency of a PWM signal will be described. As shown in FIG. 5A, in the switching element Q2, both a voltage VTr applied between a source and a gate and a current ITr flowing between the source and the gate are not 0 in a turn-on duration ΔTon during transition from an off state to an on state. In addition, as shown in FIG. 5B, in the switching element Q2, in a turn-off duration ΔToff during transition from the on state to the off state, both the voltage VTr applied between the source and the gate and the current ITr flowing between the source and the gate are not 0. Therefore, in the turn-on duration ΔTon and the turn-off duration ΔToff, a power loss (e.g., a switching loss) is generated in the switching element Q2, and this switching loss is converted into heat. That is, the turn-on duration ΔTon and the turn-off duration ΔToff corresponds to the duration in which the switching loss occurs.

Figure 6A:
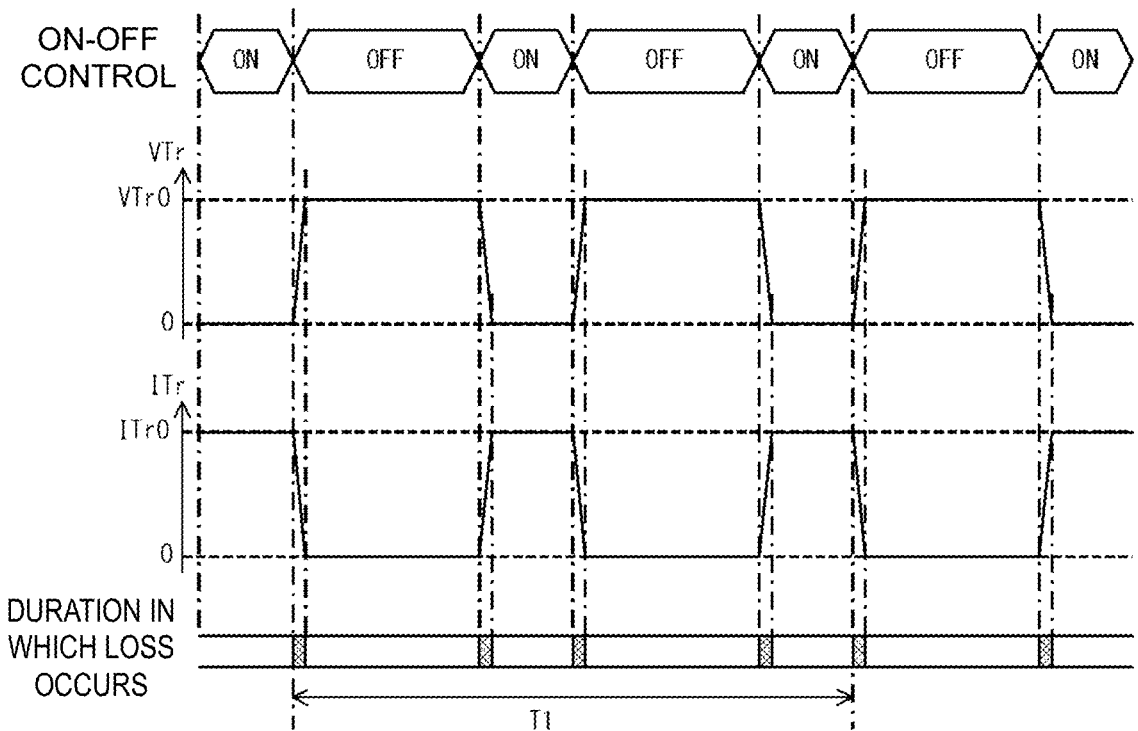
FIG. 6A is a time chart showing a relationship among on-off control of the switching element, a current waveform, a voltage waveform, and a duration in which a switching loss occurs, in a normal discharge mode.
Figure 6B:
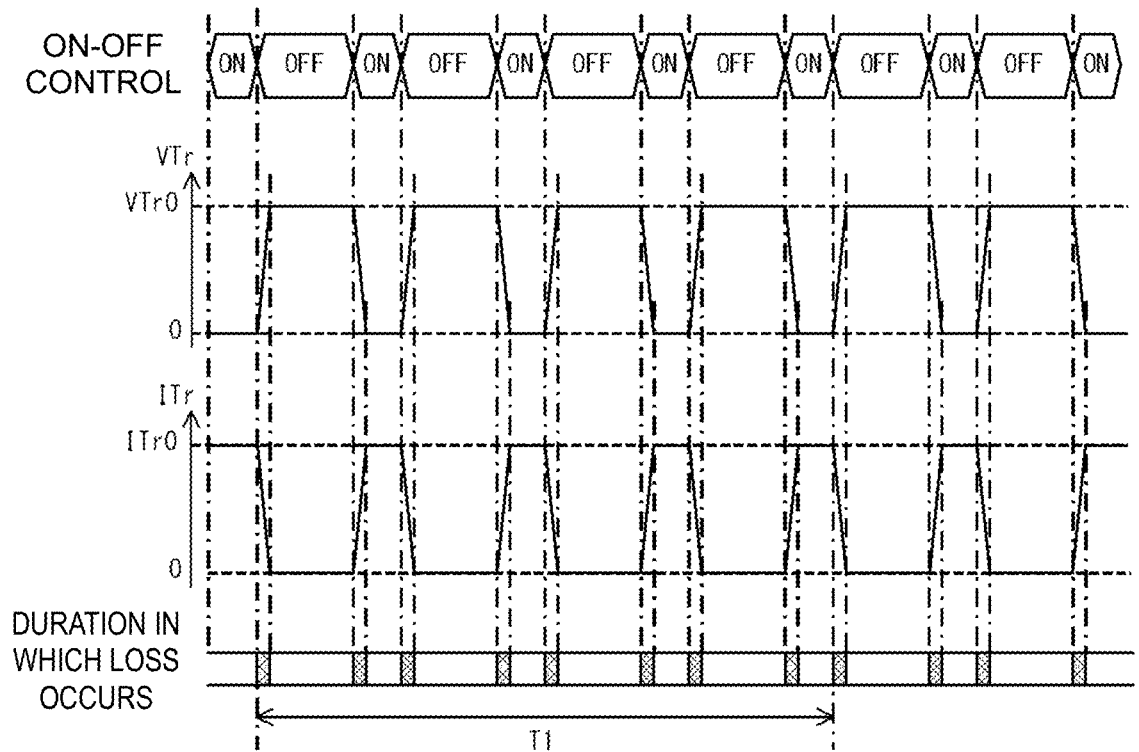
FIG. 6B is a time chart showing a relationship among the on-off control of the switching element, a current waveform, a voltage waveform, and a duration in which a switching loss occurs in the discharge mode in a state where the switching frequency is increased in comparison with the case of FIG. 6A.

For example, as shown in FIG. 6A, when the bidirectional DC-DC converter 52 is operating in the normal discharge mode, in a duration T1 corresponding to two periods of on and off operations of the switching element Q2, the duration in which the switching loss occurs comes four times (refer to the cross-hatching portions in FIG. 6A). Here, it is assumed that a frequency of the on and off operations shown in FIG. 6A is increased by two times, and thus the period of the on and off operations is reduced to ½ as shown in FIG. 6B. In this case, in the duration T1, the duration in which the switching loss occurs comes eight times. Here, it is assumed that lengths of the turn-on duration and the turn-off duration are constant without depending on the period of the on and off operations of the switching element Q2. In this case, a rate of the duration in which the switching loss occurs in the case of FIG. 6B increases twice as much as a rate of the duration when the switching loss occurs in the case of FIG. 6A. Then, when the rate of the duration in which the switching loss occurs is increased, an amount of heat generated by the switching element Q2 is increased accordingly.

Figure 7:
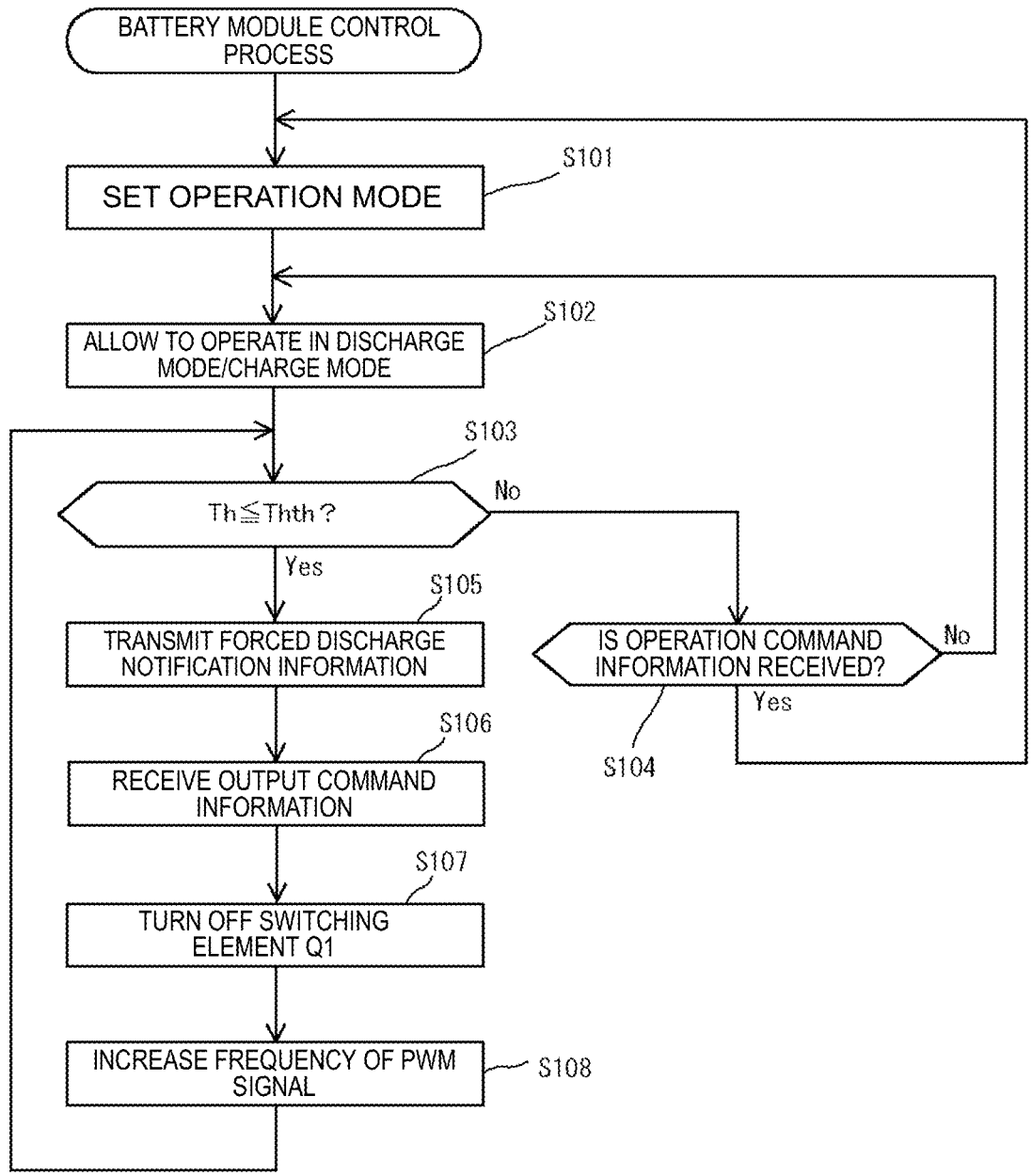
FIG. 7 is a flowchart showing an example of a procedure of a battery module control process executed by the module control unit.

Next, a battery module control process to be executed by the module control unit 53 according to the present embodiment will be described with reference to FIG. 7. Specifically, the battery module control process is started when, for example, the battery module 5 is connected to the power conditioner 3 and driving power is supplied from the HVDC bus 33 in the power conditioner 3 to the module control unit 53 through the power supply circuit 55. At this time, the module control unit 53 turns on the switching element Q3 in the inrush current prevention circuit 56 in a state where the relay RL1 is in an off state, and then turns on the relay RL1 based on magnitudes of voltage signals input from the ammeters A1 and A2 and the voltmeters V3 and V4. As a result, an overcurrent is prevented from flowing into the switching elements Q1 and Q2. Further, the module control unit 53 closes the relay RL2 before the bidirectional DC-DC converter 52 is allowed to operate.

First, the module control unit 53 sets an operation mode of the bidirectional DC-DC converter 52 to a predetermined operation mode (step S101). For example, it is previously set that the bidirectional DC-DC converter 52 is allowed to operate in the discharge mode immediately after driving power is supplied to the module control unit 53. In this case, the module control unit 53 sets the operation mode of the bidirectional DC-DC converter 52 to the discharge mode. Next, in the set operation mode, the module control unit 53 allows the bidirectional DC-DC converter 52 to operate in the discharge mode or the charge mode (step S102).

Subsequently, the module control unit 53 determines whether or not the temperature Th in the periphery of the battery 51 indicated by temperature information input from the temperature measuring unit 54 is equal to or lower than the predetermined reference temperature Thth (step S103).

When the module control unit 53 determines that the temperature Th in the periphery of the battery 51 is higher than the reference temperature Thth (step S103: No), the module control unit 53 determines whether or not operation command information has been received from the power conditioner control unit 35 (step S104). When the module control unit 53 determines that the operation command information has not been received from the power conditioner control unit 35 (step S104: No), the module control unit 53 executes the processing of step S102 as it is.

On the other hand, when the module control unit 53 determines that the operation command information has been received from the power conditioner control unit 35 (step S104: Yes), the module control unit 53 sets the operation mode of the bidirectional DC-DC converter 52 according to the operation mode indicated by the operation command information (step S101). Thereafter, the module control unit 53 executes the processing in step S102 again.

In addition, it is assumed that in the processing of step S103, the module control unit 53 determines that the temperature Th in the periphery of the battery 51 indicated by the temperature information input from the temperature measuring unit 54 is equal to or lower than the reference temperature Thth (step S103: Yes). In this case, the module control unit 53 transmits forced discharge notification information to the power conditioner control unit 35 via the communication bus 34 (step S105).

Next, when the module control unit 53 receives output command information from the power conditioner control unit 35 via the communication bus 34 (step S106), the module control unit 53 turns off the switching element Q1 in the bidirectional DC-DC converter 52 (step S107). Thus, the operation mode of the bidirectional DC-DC converter 52 is forcibly set to the charge mode.

Subsequently, the module control unit 53 increases a frequency of a PWM signal to be output to the switching element Q2 based on an output command value of the bidirectional DC-DC converter 52 indicated by the command information (step S108). Thereafter, the module control unit 53 executes the processing in step S103 again.

Figure 8A:
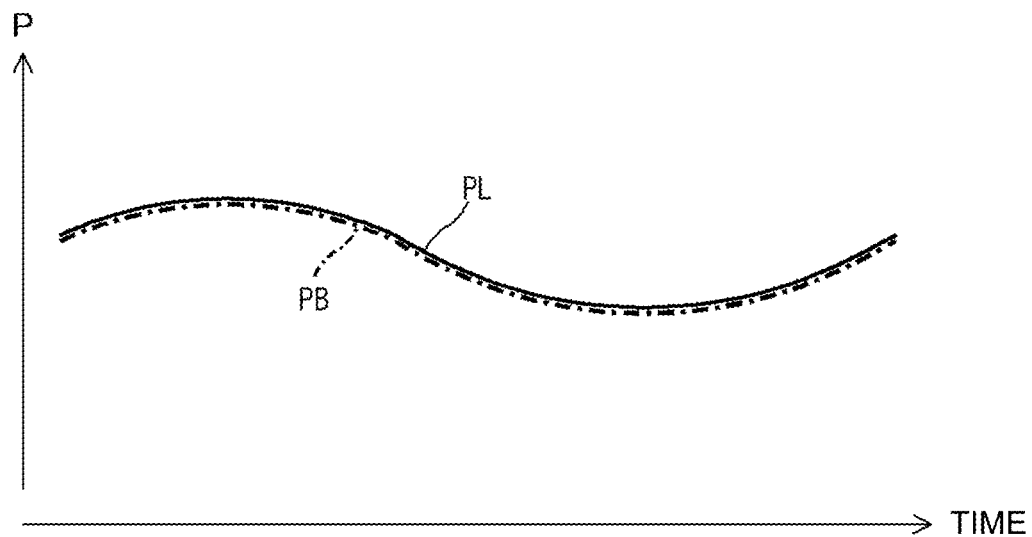
FIG. 8A is a diagram showing a change over time in power consumption in an AC load and DC power output from the battery module.
Figure 8B:
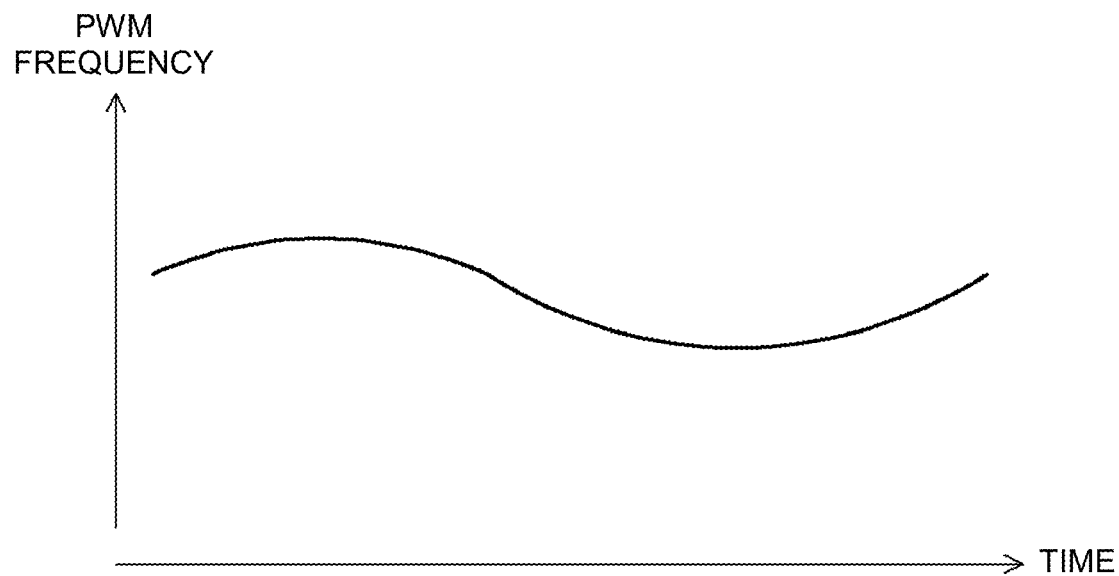
FIG. 8B is a diagram showing a change over time in a frequency of a PWM signal supplied to a bidirectional DC-DC converter.

Here, as shown in FIG. 8A, the command unit 352 in the power conditioner control unit 35 changes an output command value PB of the bidirectional DC-DC converter 52 so as to follow power consumption PL in the AC load 4. The power consumption PL in the AC load 4 corresponds to power supplied from the HVDC bus 33 to the AC load 4 via the bidirectional DC-AC inverter 32. Then, as shown in FIG. 8B, the module control unit 53 changes the frequency of the PWM signal to be output to the switching element Q2 according to the change in the output command value PB. Here, the module control unit 53 increases the frequency of the PWM signal as the output command value PB increases.

As described above, with the battery module 5 according to the present embodiment, when the temperature in the periphery of the battery 51 needs to be increased, the module control unit 53 forces the bidirectional DC-DC converter 52 to operate in the discharge mode and increases the switching frequency of the switching element Q2. Thereby, an amount of heat generated by the switching element Q2 is increased, and an amount of heat transmitted from the switching element Q2 to the periphery of the battery 51 is increased, so that the temperature in the periphery of the battery 51 can be rapidly increased. Therefore, since a heater is not required in the periphery of the battery 51 in order to increase the temperature in the periphery of the battery 51, the whole size of the battery module 5 can be reduced.

In addition, the command unit 352 according to the present embodiment outputs command information for commanding that DC power to be output from the bidirectional DC-DC converter 52 is allowed to become a maximum power within a power range in which reverse power flow from the HVDC bus 33 to the power system 2 does not occur, to the module control unit 53, according to the power consumption in the AC load 4 measured by the power measuring unit 36. Thus, the battery 51 can be efficiently heated while wasteful consumption of electricity accumulated in the battery 51 is minimized.

Further, when the temperature of the battery 51 needs to be increased, the module control unit 53 is configured to maintain the switching element Q1 in the off state. As a result, heat generated by conduction loss in a body diode of the switching element Q1 is transmitted to the periphery of the battery 51, and the amount of heat transmitted to the periphery of the battery 51 is increased. Therefore, the temperature in the periphery of the battery 51 can be rapidly increased due to the increase in the amount of heat transmitted to the periphery of the battery 51.

Also, in the present embodiment, when the battery cell of the battery 51 is a lithium ion battery, the reference temperature Thth can be set to a temperature at which metal lithium is not deposited on an electrode in the battery cell (for example, 0° C.). Thus, since the temperature of the battery 51 is maintained at a temperature at which metal lithium is not deposited on the electrode of the battery cell, explosion of the battery 51 due to deposition of metal lithium can also be prevented.

Figure 9A:
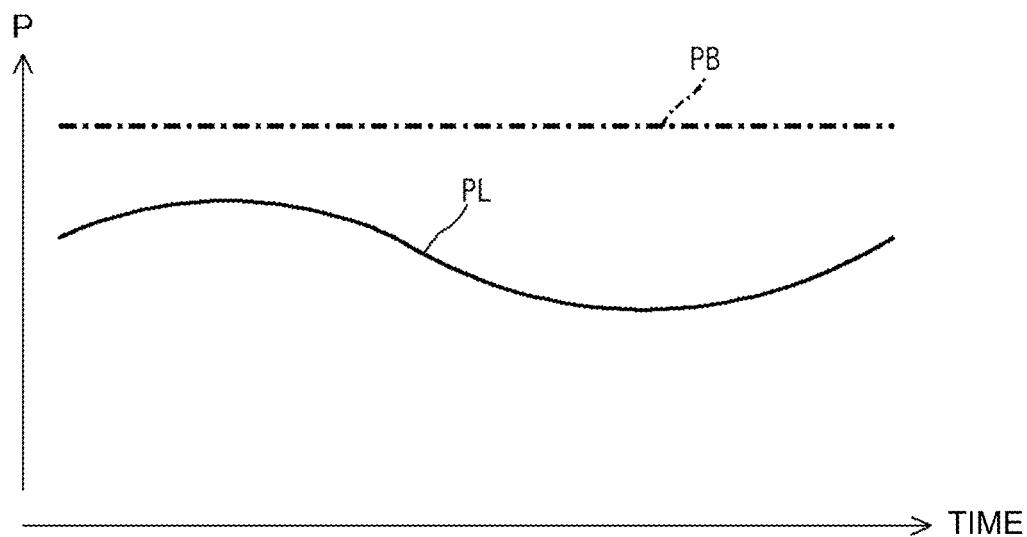
FIG. 9A is an exemplary diagram showing a change over time of power consumption in an AC load and DC power output from a battery module.

Although the exemplary embodiment has been described above, it is noted that the present invention is not limited to the configuration of the above-described embodiment. For example, when the temperature of the battery 51 needs to be increased, the module control unit 53 may set the switching frequency of the switching element Q2 to a maximum frequency within an operational range to maximize DC power to be supplied from the bidirectional DC-DC converter 52 to the HVDC bus 33 via the input/output unit te. Here, the maximum frequency of the switching frequency of the switching element Q2 is determined by switching characteristics of the switching element Q2 within the switching operational range, a clock frequency output from an oscillator incorporated in the module control unit 53, and the like. In this case, the bidirectional DC-DC converter 52 maximizes its output regardless of a state of power generation of the solar battery 1 or a state of the power system 2. For this reason, for example, as shown in FIG. 9A, the output command value PB of the bidirectional DC-DC converter 52 exceeds the power consumption PL in the AC load 4, so that reverse power flow from the HVDC bus 33 to the power system 2 may occur. It is also noted that in FIG. 9A and FIG. 9B, the power consumption PL in the AC load 4 corresponds to power supplied from the HVDC bus 33 to the AC load 4 via the bidirectional DC-AC inverter 32.

Here, the module control unit 53 may control a duration during which the bidirectional DC-DC converter 52 is operated at the maximum output such that the battery 51 does not become in an overdischarge state. For example, it is assumed that the battery module 5 includes a Battery Management Unit (BMU) for monitoring a State Of Charge (SOC) of the battery 51. In this case, when the BMU detects that the SOC of the battery 51 becomes lower than or equal to the predetermined reference value, the module control unit 53 can be configured to reduce the output of the bidirectional DC-DC converter 52.

According to this configuration, since the rate of the period in which the switching loss occurs in the switching element Q2 can be maximized, the amount of heat generated by the switching element Q2 is also maximized, and accordingly, the temperature of the battery 51 is rapidly increased. Further, an amount of heat generated by the inductor L1 increases due to an increase in a current flowing through the inductor L1. Thus, an amount of heat transmitted from the inductor L1 to the periphery of the battery 51 is also increased, so that the temperature of the battery 51 is further increased.

Figure 9B:
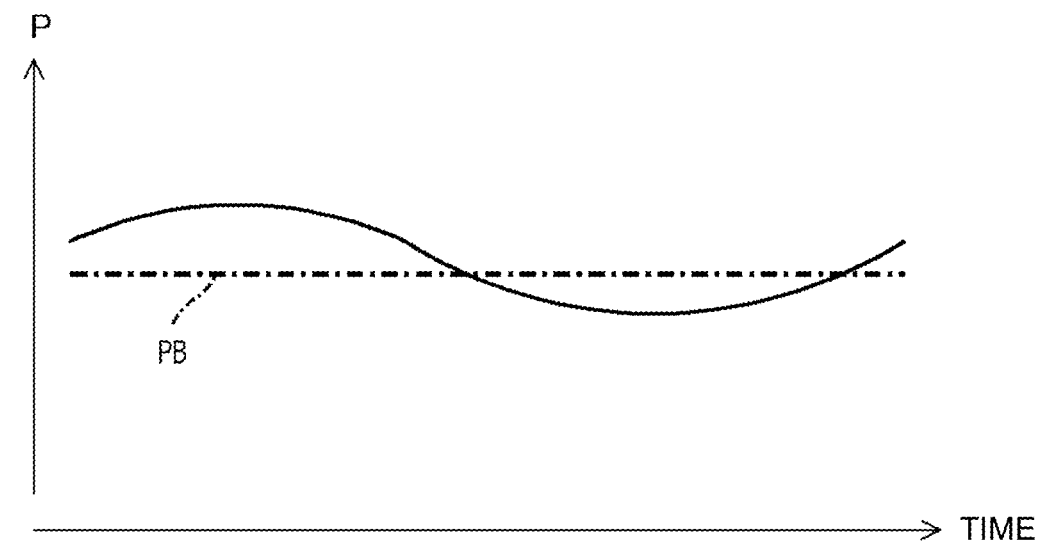
FIG. 9B is an exemplary diagram showing a change over time of power consumption in the AC load and DC power output from the battery module.

In the embodiment, the example is explained in which the command unit 352 transmits the command information indicating the output command value corresponding to the maximum output of the bidirectional DC-DC converter 52 within the range in which the reverse power flow from the HVDC bus 33 to the power system 2 does not occur, to the module control unit 53. However, the present invention is not limited thereto, and for example, the command unit 352 may output command information indicating a predetermined output command value where DC power to be output from the bidirectional DC-DC converter 52 is equal to or lower than the maximum output of the bidirectional DC-DC converter 52, to the module control unit 53. In this case, for example, as shown in FIG. 9B, the output command value PB of the bidirectional DC-DC converter 52 is higher than the power consumption PL in the AC load 4, and a duration in which the reverse power flow from the HVDC bus 33 to the power system 2 may occur and a duration in which the output command value PB of the bidirectional DC-DC converter 52 is equal to or lower than the power consumption PL in the AC load 4 and the reverse power flow from the HVDC bus 33 to the power system 2 does not occur are mixed. In a duration in which the reverse power flow from the HVDC bus 33 to the power system 2 does not occur, DC power may be supplied, for example, from the solar battery 1 to the HVDC bus 33 via the PV converter 31.

Also with this configuration, since the rate of the duration in which the switching loss occurs in the switching element Q2 can be increased, the amount of heat generated by the switching element Q2 can be increased, and the temperature of the battery 51 can be increased accordingly.

In the exemplary embodiment, the example has been explained in which the battery module 5 includes the temperature measuring unit 54 (e.g., temperature sensor), and the module control unit 53 forces the bidirectional DC-DC converter 52 to operate in the discharge mode when the temperature measured by the temperature measuring unit 54 becomes equal to or lower than the reference temperature. However, it is noted that the present invention is not limited thereto, and for example, the power conditioner 3 may include an air temperature measuring unit (not shown) for measuring an air temperature at a place where the battery module 5 is installed. Then, when a temperature measured by the air temperature measuring unit is equal to or lower than the predetermined reference temperature, the command unit 352 may transmit command information commanding that the bidirectional DC-DC converter 52 is to be forced to operate in the discharge mode and a frequency of a PWM signal is to be increased, to the module control unit 53.

With this configuration, since it is not necessary to arrange the temperature measuring unit 54 in the battery module 5, it is possible to reduce the size of the battery module 5, accordingly.

In the embodiment, the example is explained in which the module control unit 53 is configured to maintain the switching element Q1 in the off state when the bidirectional DC-DC converter 52 is forced to operate in the discharge mode. However, it is noted that the present invention is not limited thereto, and the module control unit 53 may control the switching element Q1 to be in the on state as appropriate.

In the embodiment described above, the example is explained in which the power generator is the solar battery 1, but the present invention is not limited to the solar battery as long as it is a power generator using natural energy, and may be, for example, a wind power generator.

It is noted that although the present invention has been described with reference to the exemplary embodiment and the modification, it should be understood that the present invention is not limited to the above-described exemplary embodiment and modification. For example, the present invention can include a combination of the embodiment and the modification as appropriate, and an appropriate change thereof.

REFERENCE SIGNS LIST

1 SOLAR BATTERY
2 POWER SYSTEM
3 POWER CONDITIONER
4 AC LOAD
5 BATTERY MODULE
31 PV CONVERTER
32 BIDIRECTIONAL DC-AC INVERTER
33 HVDC BUS
34 COMMUNICATION BUS
35 POWER CONDITIONER CONTROL UNIT
36 POWER MEASURING UNIT
51 BATTERY
52 BIDIRECTIONAL DC-DC CONVERTER
53 MODULE CONTROL UNIT
54 TEMPERATURE MEASURING UNIT
55 POWER SUPPLY CIRCUIT
56 INRUSH CURRENT PREVENTION CIRCUIT
351 POWER CONSUMPTION ACQUISITION UNIT
352 COMMAND UNIT
A1, A2 AMMETER
A1_t, A2_t, V1_t, V2_t, V3_t, V4_t INPUT TERMINAL
C1 CAPACITOR
D1 DIODE
L1 INDUCTOR
Q1, Q2, Q3 SWITCHING ELEMENT
Q1_t, Q2_t, Q3_t, RL1_t, RL2_t OUTPUT TERMINAL
R1, R2 RESISTOR
RL1, RL2 RELAY
te INPUT/OUTPUT UNIT
te1, te2 INPUT/OUTPUT TERMINAL
V1, V2, V3, V4 VOLTMETER

The invention claimed is:

1. A power storage module comprising:
a secondary battery;
a bidirectional DC-DC converter that includes a switching element that is arranged at a position, such that heat generated by the switching element is transmitted to the secondary battery, wherein the bidirectional DC-DC converter is configured to operate in a discharge mode to convert DC power from the secondary battery and to supply the converted DC power to an input/output unit, and to operate in a charge mode to convert DC power from the input/output unit and to supply the converted DC power to the secondary battery;
a control unit configured to force the bidirectional DC-DC converter to operate in the discharge mode and to increase a switching frequency of the switching element to increase a temperature of the secondary battery; and
a power conditioner including a command unit configured to output command information to the control unit that controls an output from the bidirectional DC-DC converter to become a maximum output within an output range such that there is no reverse power flow from a DC bus line to a power system, to the control unit,
wherein the command information is based on a power consumption in an AC load and is output when the temperature of the secondary battery is to be increased.

2. The power storage module according to claim 1, wherein the control unit is further configured to increase the switching frequency of the switching element relative to a switching frequency in a normal driving of the switching element.

3. The power storage module according to claim 1, wherein the control unit is configured to set the switching frequency of the switching element to a maximum frequency within an operational range to maximize the DC power supplied from the bidirectional DC-DC converter to the input/output unit when the control unit determines the temperature of the secondary battery needs to be increased.

4. The power storage module according to claim 1, wherein the bidirectional DC-DC converter includes:
an inductor connected at a first end to an output terminal on a high potential side of the secondary battery,
a first switching element connected between a second end of the inductor and the input/output unit, and
a second switching element connected between the second end of the inductor and an output end on a low potential side of the secondary battery.

5. The power storage module according to claim 4, wherein the control unit is configured to maintain the first switching element in an off state when the control unit determines the temperature of the secondary battery needs to be increased.

6. The power storage module according to claim 1, wherein the secondary battery comprises a lithium ion battery.

7. The power storage module according to claim 1, wherein the secondary battery includes a temperature sensor configured to measure the temperature of the secondary battery.

8. The power storage module according to claim 7, wherein the control unit is configured to increase the switching frequency of the switching element when the temperature sensor detects that the temperature of the secondary battery is below a predetermined temperature reference value.

9. The power storage module according to claim 1, further comprising a housing with the bidirectional DC-DC converter housed in a position upward of a position of the secondary battery relative to a bottom portion of the housing, such that heat generated by the switching element in the bidirectional DC-DC converter is transmitted to the secondary battery through convection of air existing in the housing.

10. A power supply system comprising:
a power conditioner including:
a DC bus line,
a DC-DC converter configured to convert DC power supplied from a power generator to DC power having a different voltage value, and further configured to supply the converted DC power to the DC bus line, and
a bidirectional DC-AC inverter configured to convert AC power supplied from a power system to DC power and to supply the converted DC power to the DC bus line, and further configured to convert DC power supplied from the DC bus line into AC power and to supply the converted AC power to an AC load connected to the power system; and
a power storage module including:
a secondary battery,
a bidirectional DC-DC converter that includes a switching element that is arranged at a position where heat generated by the switching element is transmitted to the secondary battery, wherein the bidirectional DC-DC converter is configured to operate in a discharge mode to convert DC power from the secondary battery and to supply the converted DC power to the DC bus line through an input/output unit, and to operate in a charge mode to convert DC power from the DC bus line through the input/output unit and to supply the converted DC power to the secondary battery, and
a control unit configured to force the bidirectional DC-DC converter to operate in the discharge mode and to increase a switching frequency of the switching element to increase a temperature of the secondary battery;
wherein the power conditioner further includes a command unit configured to output command information to the control unit that controls an output from the bidirectional DC-DC converter to become a maximum output within an output range such that there is no reverse power flow from the DC bus line to the power system, and
wherein the command information is based on a power consumption in the AC load, and is output when the temperature of the secondary battery is to be increased.

11. The power supply system according to claim 10, wherein the control unit is further configured to increase the switching frequency of the switching element relative to a switching frequency in a normal driving of the switching element.

12. The power supply system according to claim 10, wherein the power conditioner includes:
a power measuring unit configured to measure power consumption in the AC load.

13. The power supply system according to claim 10, wherein the power conditioner includes a command unit configured to output command information that controls an output of the bidirectional DC-DC converter to become a predetermined output that is equal to or lower than a maximum output of the bidirectional DC-DC converter, to the control unit, when a temperature of the secondary battery needs to be increased.

14. The power supply system according to claim 10, wherein the control unit is configured to set the switching frequency of the switching element to a maximum frequency within an operational range to maximize the DC power supplied from the bidirectional DC-DC converter to the DC bus line through the input/output unit when the control unit determines the temperature of the secondary battery needs to be increased.

15. The power supply system according to claim 10, wherein the bidirectional DC-DC converter includes:
an inductor connected at a first end to an output terminal on a high potential side of the secondary battery,
a first switching element connected between a second end of the inductor and the input/output unit, and
a second switching element connected between the second end of the inductor and an output end on a low potential side of the secondary battery.

16. The power supply system according to claim 15, wherein the control unit is configured to maintain the first switching element in an off state when the control unit determines the temperature of the secondary battery needs to be increased.

17. The power supply system according to claim 10, wherein the secondary battery comprises a lithium ion battery.

18. The power supply system according to claim 10, wherein the secondary battery includes a temperature sensor configured to measure the temperature of the secondary battery.

19. The power supply system according to claim 18, wherein the control unit is configured to increase the switching frequency of the switching element when the temperature sensor detects that the temperature of the secondary battery is below a predetermined temperature reference value.

20. The power supply system according to claim 10, wherein the power storage module further comprises a housing with the bidirectional DC-DC converter housed in a position upward of a position of the secondary battery relative to a bottom portion of the housing, such that heat generated by the switching element in the bidirectional DC-DC converter is transmitted to the secondary battery through convection of air existing in the housing.

* * * * *